US008529299B2

United States Patent
Chang et al.

(10) Patent No.: US 8,529,299 B2
(45) Date of Patent: Sep. 10, 2013

(54) CONNECTOR AND ELECTRONIC APPARATUS SYSTEM

(75) Inventors: Fang-Ta Chang, New Taipei (TW); Chia-Lian Yen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 13/454,348

(22) Filed: Apr. 24, 2012

(65) Prior Publication Data

US 2013/0178111 A1    Jul. 11, 2013

(30) Foreign Application Priority Data

Jan. 6, 2012   (TW) .............................. 101100675 A

(51) Int. Cl.
*H01R 33/00*    (2006.01)
(52) U.S. Cl.
USPC .......................................................... 439/660
(58) Field of Classification Search
USPC .................. 439/660, 851, 850, 842, 845, 495
See application file for complete search history.

(56) References Cited

U.S. PATENT DOCUMENTS

| | | | | |
|---|---|---|---|---|
| 3,339,169 A | * | 8/1967 | Freeland | 439/55 |
| 4,726,786 A | * | 2/1988 | Hill | 439/504 |
| 5,244,397 A | * | 9/1993 | Anhalt | 439/101 |
| 5,404,268 A | * | 4/1995 | O'Connor | 361/679.31 |
| 6,394,813 B1 | * | 5/2002 | Stout et al. | 439/11 |
| 6,612,874 B1 | * | 9/2003 | Stout et al. | 439/640 |
| 6,630,747 B1 | * | 10/2003 | Kamada et al. | 307/10.1 |
| 6,758,689 B1 | * | 7/2004 | Bair et al. | 439/136 |
| 6,881,098 B2 | * | 4/2005 | Jeansonne et al. | 439/638 |
| 6,981,887 B1 | * | 1/2006 | Mese et al. | 439/244 |
| 7,553,172 B2 | * | 6/2009 | Chiu et al. | 439/131 |
| 2003/0148663 A1 | * | 8/2003 | Hsin | 439/638 |
| 2003/0171035 A1 | * | 9/2003 | Yoo | 439/638 |
| 2003/0224637 A1 | * | 12/2003 | Ling | 439/133 |
| 2005/0079738 A1 | * | 4/2005 | Ahn | 439/1 |

* cited by examiner

*Primary Examiner* — Neil Abrams
*Assistant Examiner* — Phuongchi T Nguyen
(74) *Attorney, Agent, or Firm* — Muncy, Geissler, Olds & Lowe, PLLC

(57) ABSTRACT

A connector is disclosed. The connector includes a first connection component and a second connection component. The first connection component includes two groups of contact pins and the second connection component includes two groups of corresponding pins. The two groups of contact pins are arranged in an opposite order and the two groups of corresponding pins are also arranged in an opposite order.

2 Claims, 9 Drawing Sheets

CONNECTOR AND ELECTRONIC APPARATUS SYSTEM

BACKGROUND OF THE INVENTION

1. Field of the Invention

The present invention relates to a connector and an electronic apparatus system that employs such a connector; specifically, it relates to a connector capable of having either forward connection or reverse connection and an electronic apparatus system that employs such a connector.

2. Description of the Related Art

In the electronics industry, in order to have an application function with other peripheral devices, it is necessary to utilize a connector as an interface; therefore, all kinds of connectors have been developed. Generally speaking, such connectors comprise male connectors and female connectors. When connected, one end of a male connector is connected with a device and one end of a female connector is connected with another device. The other end of the male connector and the other end of the female connector are electrically connected to achieve the connection between the devices. Currently, however, the majority of connectors offer only unidirectional plug-in, so users need to take the directivity into consideration while plugging an electronic device into another electronic device. In order to enable both forward connection and reverse connection on another device, it is necessary to place two male (or female) connectors in the electronic device, while placing one female (or male) connector in another electronic device, or vice versa. Thus the cost of manufacturing the connector will be increased.

For the above reason, it is necessary to provide an electrical connector so that the aforementioned problem can be obviated.

SUMMARY OF THE INVENTION

The present invention presents a connector capable of having either forward connection or reverse connection.

The present invention is also related to an electronic apparatus system.

According to one embodiment of the present invention, the connector in the present invention includes a first connection component and a second connection component. The first connection component includes a first connecting casing and a plurality of contact pins; the plurality of contact pins are mounted up on the first connecting casing, wherein the plurality of contact pins include a plurality of first group contact pins and a plurality of second group contact pins; the number of the plurality of first group contact pins and the number of the plurality of second group contact pins are equal; the sequence of pins of the plurality of first group contact pins and the sequence of pins of the plurality of second group contact pins are arranged in an opposite order. The second connection component includes a second connecting casing and a plurality of corresponding pins; the plurality of corresponding pins are mounted up on the second connecting casing, wherein the plurality of corresponding pins include a plurality of first group corresponding pins and a plurality of second group corresponding pins; the number of the plurality of first group corresponding pins and the number of the plurality of second group corresponding pins are equal; the sequence of pins of the plurality of first group corresponding pins and the sequence of pins of the plurality of second group corresponding pins are arranged in an opposite order. With this arrangement, when the first connection component and the second connection component are connected with a forward connection, the plurality of first group contact pins are connected to the plurality of first group corresponding pins, and the plurality of second group contact pins are connected to the plurality of second group corresponding pins; when the first connection component and the second connection component are connected with a reverse connection, the plurality of first group contact pins are connected to the plurality of second group corresponding pins, and the plurality of second group contact pins are connected to the plurality of first group corresponding pins.

In accordance with one embodiment of the present invention, the electronic apparatus system includes a first electronic device, a second electronic device, and the above stated connector, which can be connected to the first electronic device and the second electronic device forwardly or reversely.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENTS

In order to make it easier to understand the purposes, features and advantages of the present invention, hereinafter, specific embodiments of the present invention are presented below, with illustrations and descriptions in detail.

Figure 1:
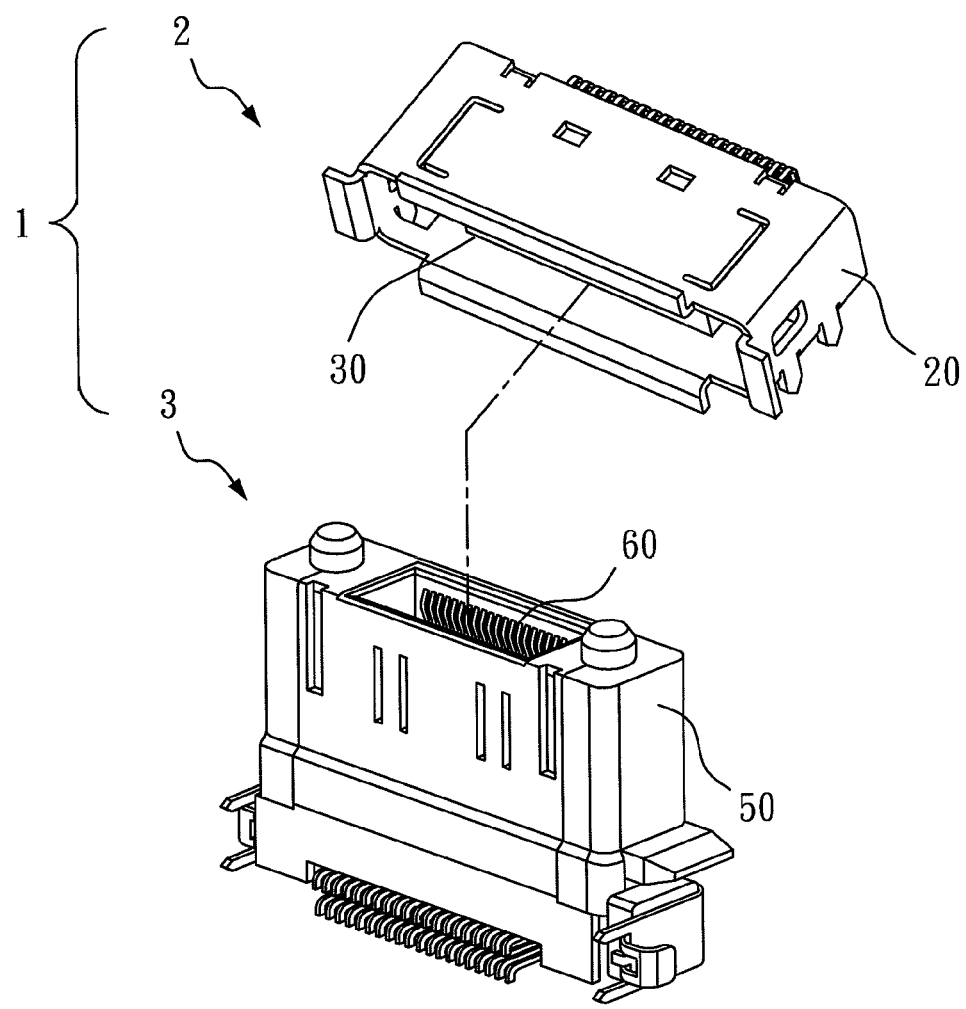
FIG. 1 is a structural drawing of a connector, in accordance with one embodiment of the present invention.
Figure 2:
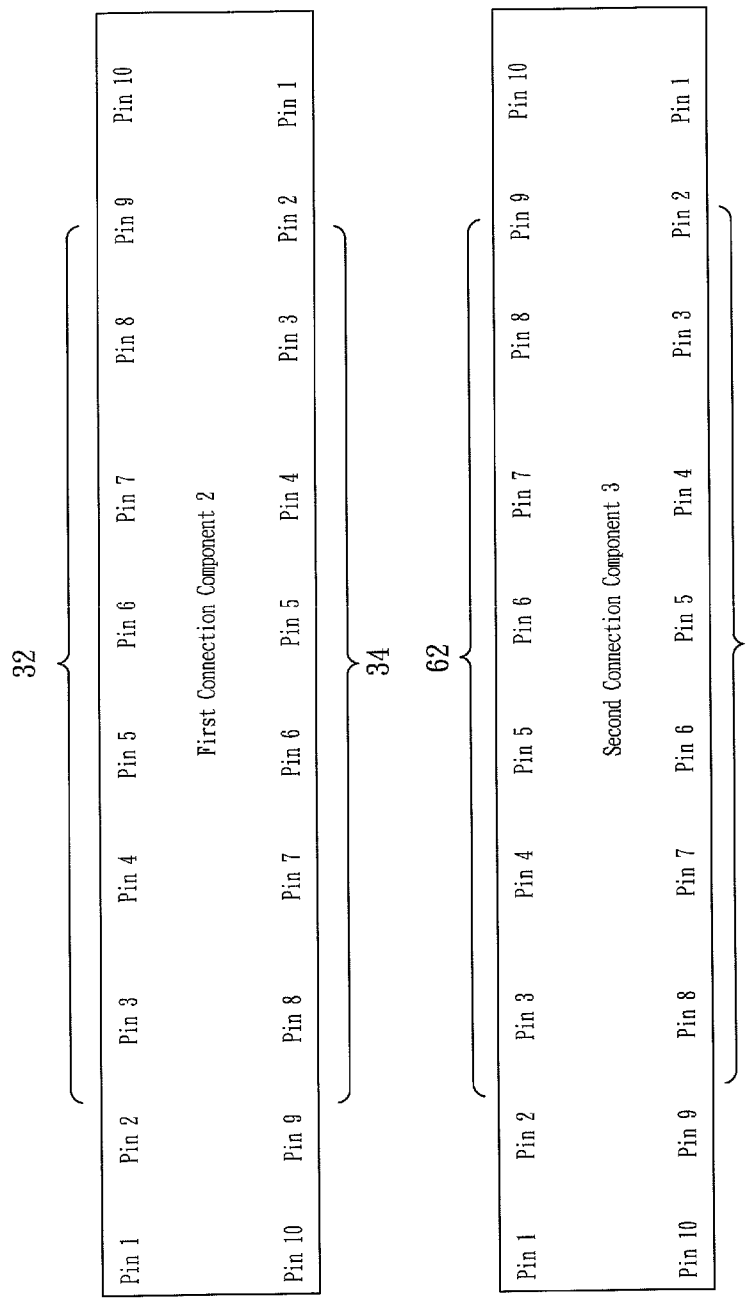
FIG. 2 is an illustration of the order of pins of a connector, in accordance with one embodiment of the present invention.

For the following, please refer to both FIG. 1 and FIG. 2, which are related to one embodiment of the connector of the present invention. Firstly, please refer to FIG. 1, a structural drawing of a connector according to one embodiment of the present invention. In accordance with one embodiment of the present invention, the connector 1 of the present invention includes a first connection component 2 and a second connection component 3, wherein the first connection component 2 includes a first connecting casing 20 and a plurality of contact pins 30, and the plurality of contact pins 30 are mounted upon the first connecting casing 20; the second connection component 3 includes a second connecting casing 50 and a plurality of corresponding pins 60, and the plurality of corresponding pins 60 are mounted upon the second connecting casing 50.

Continuing, please refer to FIG. 2, an illustration of the order of pins of a connector, in accordance with one embodiment of the present invention. In accordance with one embodiment of the present invention, the plurality of contact pins 30 of the first connection component 2 include a plurality of first group contact pins 32 and a plurality of second group contact pins 34. Among them, the number of the plurality of first group contact pins 32 is equal to the number of the plurality of second group contact pins 34, and the order of pins of the plurality of first group contact pins 32 is arranged opposite to the order of pins of the plurality of second group contact pins 34. As shown in FIG. 2, the plurality of first group contact pins 32 include ten contact pins (Pin 1~Pin 10), and Pin 1 to Pin 10 are arranged sequentially from left to right; the plurality of second group contact pins 34 also include ten contact pins (Pin 1~Pin 10); however, Pin 1 to Pin 10 are sequentially arranged from right to left.

Similarly, the plurality of corresponding pins 60 of the second connection component 3 include a plurality of first group corresponding pins 62 and a plurality of second group corresponding pins 64. Among them, the number of the plurality of first group corresponding pins 62 is equal to the number of the plurality of second group corresponding pins 64, and the order of pins of the plurality of first group corresponding pins 62 is opposite to the order of pins of the plurality of second group corresponding pins 64. As shown in FIG. 2, the plurality of first group corresponding pins 62 include ten corresponding pins (Pin 1~Pin 10), and Pin 1 to Pin 10 are arranged sequentially from left to right; the plurality of second group corresponding pins 64 also include ten corresponding pins (Pin 1~Pin 10); however, Pin 1 to Pin 10 are sequentially arranged from right to left. Also note that the number of the plurality of first group contact pins 32, the plurality of second group contact pins 34, the plurality of first group corresponding pins 62, and the plurality of second group corresponding pins 64 are not limited to ten; it can be increased or decreased as needed.

Figure 3:
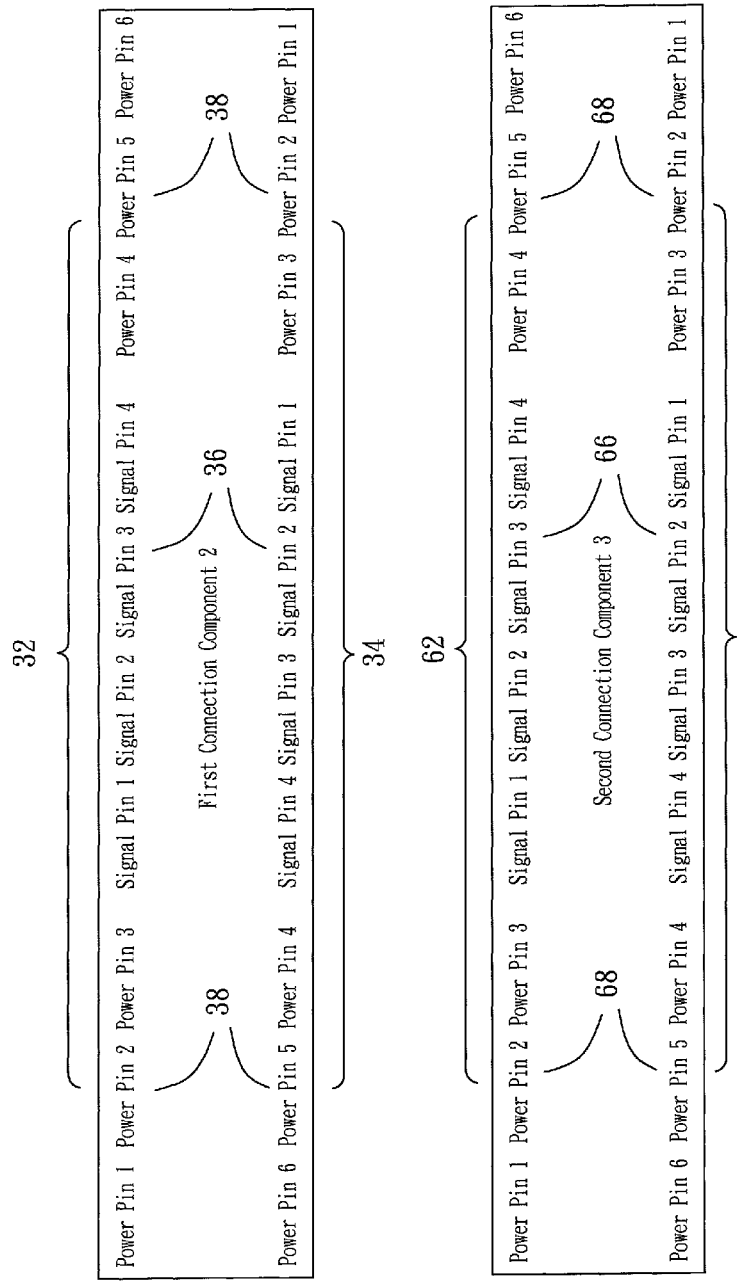
FIG. 3 is an illustration of the order of pins of a connector, in accordance with another embodiment of the present invention.

Next please refer to FIG. 3, an illustration of the order of pins of a connector, in accordance with another embodiment of the present invention. In accordance with another embodiment of the present invention, the plurality of contact pins 30 includes a plurality of signal contact pins 36 and a plurality of power contact pins 38, and the plurality of corresponding pins 60 includes a plurality of signal corresponding pins 66 and a plurality of power corresponding pins 68. As shown in FIG. 3, in the first connection component 2, there are twenty contact pins 30, which are divided into a plurality of first group contact pins 32 (ten pins) and a plurality of second group contact pins 34 (ten pins). Moreover, the plurality of first group contact pins 32 and the plurality of second group contact pins 34 are further divided into six power contact pins 38 (Power Pin 1~Power Pin 6) and four signal contact pins 36 (Signal Pin 1~Signal Pin 4) respectively; similarly, the second connection component 3 has twenty corresponding pins 60, which are divided into a plurality of first group corresponding pins 62 (ten pins) and a plurality of second group corresponding pins 64 (ten pins). Moreover, the plurality of first group corresponding pins 62 and the plurality of second group corresponding pins 64 are further divided into six power corresponding pins 68 (Power Pin 1~Power Pin 6) and four signal corresponding pins 66 (Signal Pin 1~Signal Pin 4) respectively.

As shown in FIG. 3, in accordance with one embodiment of the present invention, the plurality of signal contact pins 36 (Signal Pin 1~Signal Pin 4) are set in the middle of the plurality of power contact pins 38 (Power Pin 1~Power Pin 6). The sequence of the plurality of signal contact pins 36 in the plurality of first group contact pins 32 is arranged from left to right, in the order from Signal Pin 1 to Signal Pin 4, while the sequence of the plurality of signal contact pins 36 in the plurality of second group contact pins 34 is arranged from right to left, in the order from Signal Pin 1 to Signal Pin 4. The two sequences are arranged in the opposite order. Similarly, the sequence of the plurality of power contact pins 38 in the plurality of first group contact pins 32 is from left to right, in the order from Power Pin 1 to Power Pin 6, while the sequence of the plurality of power contact pins 38 in the plurality of second group contact pins 34 is from right to left, in the order of Power Pin 1 to Power Pin 6. The two sequences are arranged in the opposite order.

In contrast, the plurality of signal corresponding pins 66 (Signal Pin 1~Signal Pin 4) are set in the middle of the plurality of power corresponding pins 68 (Power Pin 1~Power Pin 6). The plurality of signal corresponding pins 66 in the plurality of first group corresponding pins 62 are in sequence from left to right, in the order from Signal Pin 1 to Signal Pin 4, while the plurality of signal corresponding pins 66 in the plurality of second group corresponding pins 64 are in sequence from right to left, in the order from Signal Pin 1 to Signal Pin 4. The two sequences are arranged in an opposite order. Similarly, the plurality of power corresponding pins 68 in the plurality of first group corresponding pins 62 are set in sequence from left to right, in the order from Power Pin 1 to Power Pin 6, while the plurality of power corresponding pins 68 in the plurality of second group corresponding pins 64 are set in sequence from right to left, in the order from Power Pin 1 to Power Pin 6. The two sequences are arranged in the opposite order.

The plurality of signal contact pins 36 may be set in the middle of the plurality of power contact pins 38 and the plurality of signal corresponding pins 66 may be set in the middle of the plurality of power corresponding pins 68 comprise just one embodiment of the present invention. The arrangement of pins of a connector is not limited to what is stated above.

Please refer to FIG. 4A to FIG. 5D, which are related to the electronic apparatus system, in accordance with one embodiment of the present invention. As shown in FIG. 4A to FIG. 5D, the connector 1 of the present invention can be applied to the electronic apparatus system M to connect the first electronic device 90 (a tablet PC in this embodiment, with a display screen 92 and a casing surface 94) and the second electronic device 100 (an expansion port in this embodiment, with a keyboard 102), and works for either forward or reverse connection. It is illustrated with the connector 1 shown in FIG. 3 used to connect two electronic devices, which serves as one of the embodiments.

Figure 4A:
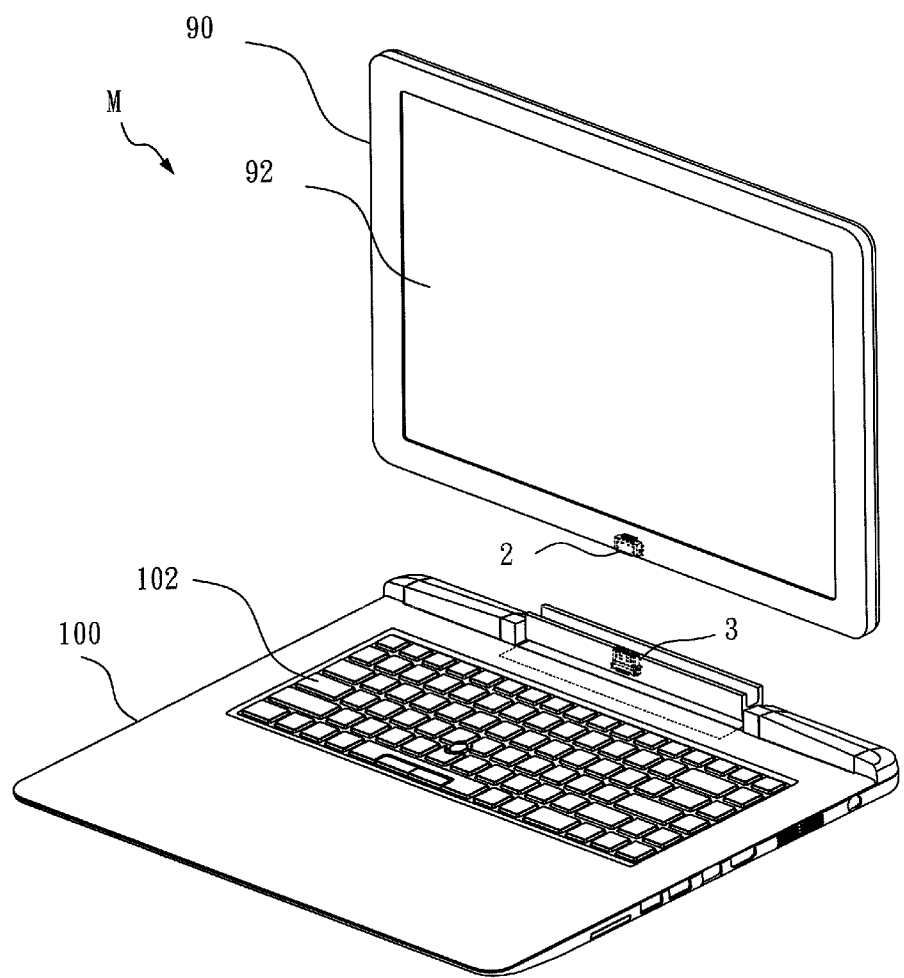
FIGS. 4A, 4B, 4C and 4D illustrate an implementation of forward connection of a connector, in accordance with one embodiment of the present invention.

Please refer to FIG. 4A, FIG. 4B, FIG. 4C and FIG. 4D, which are illustrations of an implementation of forward connection of a connector, in accordance with one embodiment of the present invention. As shown in FIG. 4A, when connector 1 of the present invention is used to establish a forward connection to connect the first electronic device 90 and the second electronic device 100, the display screen 92 of the first electronic device 90 faces one end of the second electronic device 100. The first connection component 2 is positioned on the first electronic device 90 and the second connection component 3 is positioned on the second electronic device 100.

Figure 4B:
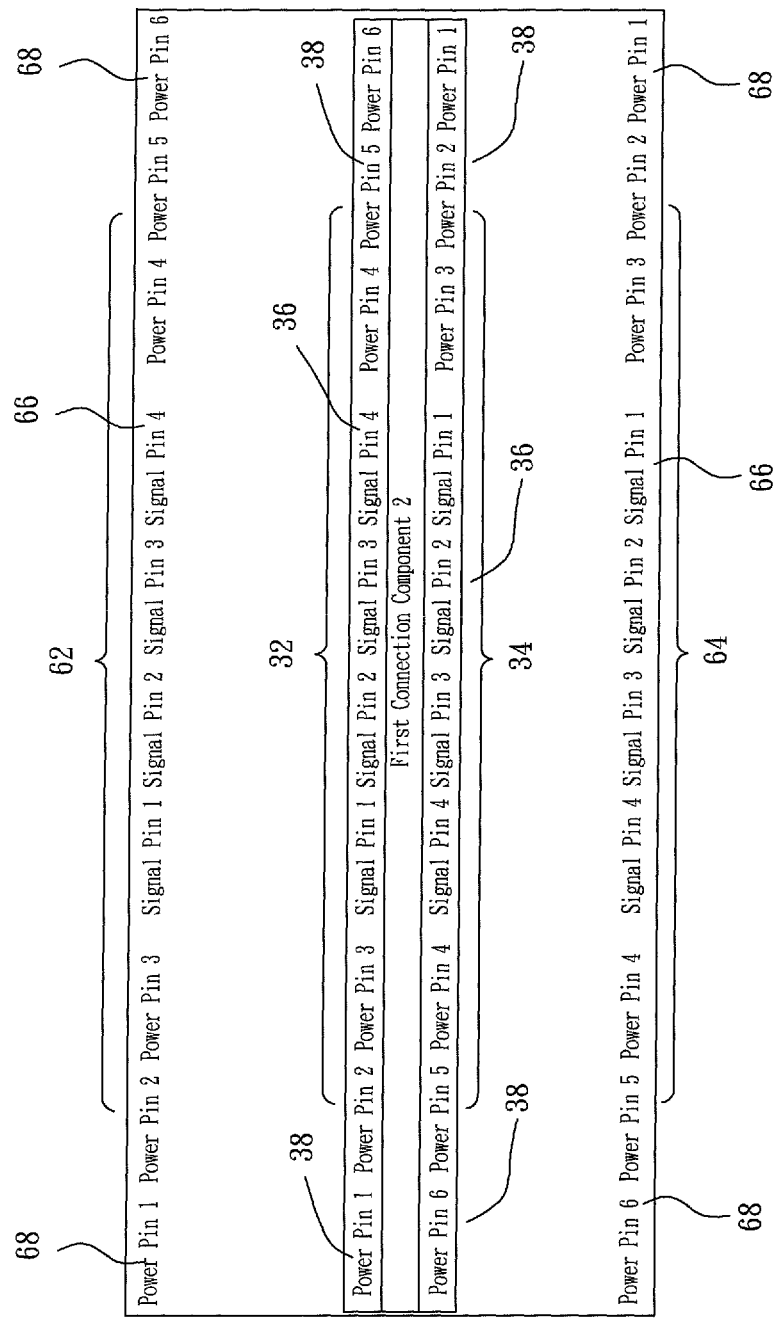

Now please refer to FIG. 4B. When the first connection component 2 establishes a forward connection with the second connection component 3, the plurality of first group contact pins 32 connect with the plurality of first group corresponding pins 62, and the plurality of second group contact pins 34 connect with the plurality of second group corresponding pins 64. Among them, the plurality of signal contact pins 36 in the plurality of first group contact pins 32 connect with the plurality of signal corresponding pins 66 in the plurality of first group corresponding pins 62, while the plurality of power contact pins 38 in the plurality of first group contact pins 32 connect with the plurality of power corresponding pins 68 in the plurality of first group corresponding pins 62; the plurality of signal contact pins 36 in the plurality of second group contact pins 34 connect with the plurality of signal corresponding pins 66 in the plurality of second group corresponding pins 64, while the plurality of power contact pins 38 in the plurality of second group contact pins 34 connect with the plurality of power corresponding pins 68 in the plurality of second group corresponding pins 64.

Figure 4C:
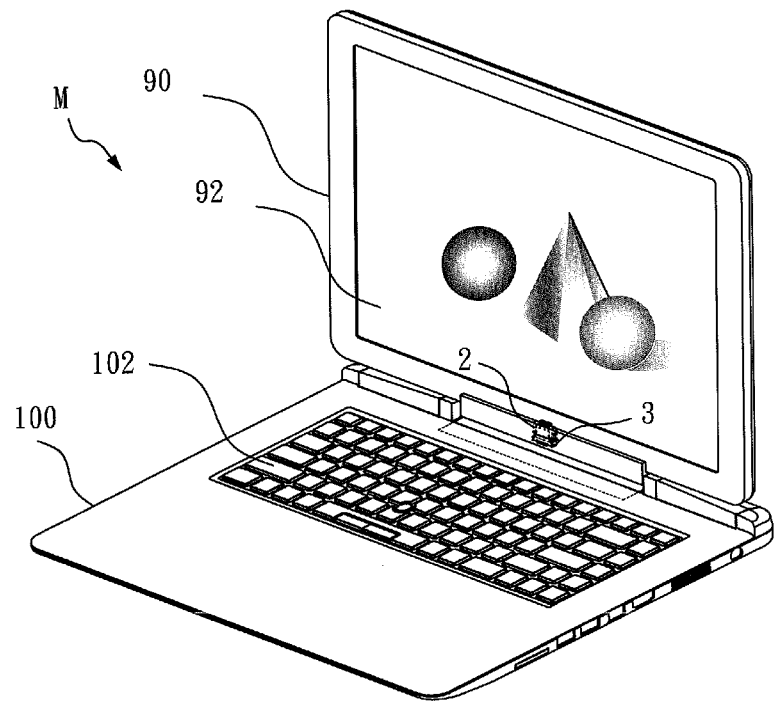
Figure 4D:
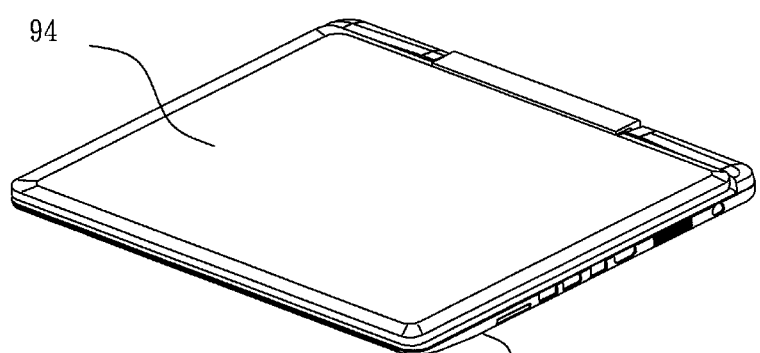

Please refer to FIG. 4C. When the first electronic device 90 and the second electronic device 100 are unfolded and in use, the display screen 92 of the first electronic device 90 faces one end of the second electronic device 100. Users can watch the picture on the display screen 92 and manipulate the first electronic device 90 with the keyboard 102 of the second electronic device 100. As shown in FIG. 4D, when the first electronic device 90 and the second electronic device 100 are folded up, the casing surface 94 of the first electronic device 90 faces upward. At this point, the entire electronic apparatus system M is equivalent to a notebook computer.

Figure 5A:
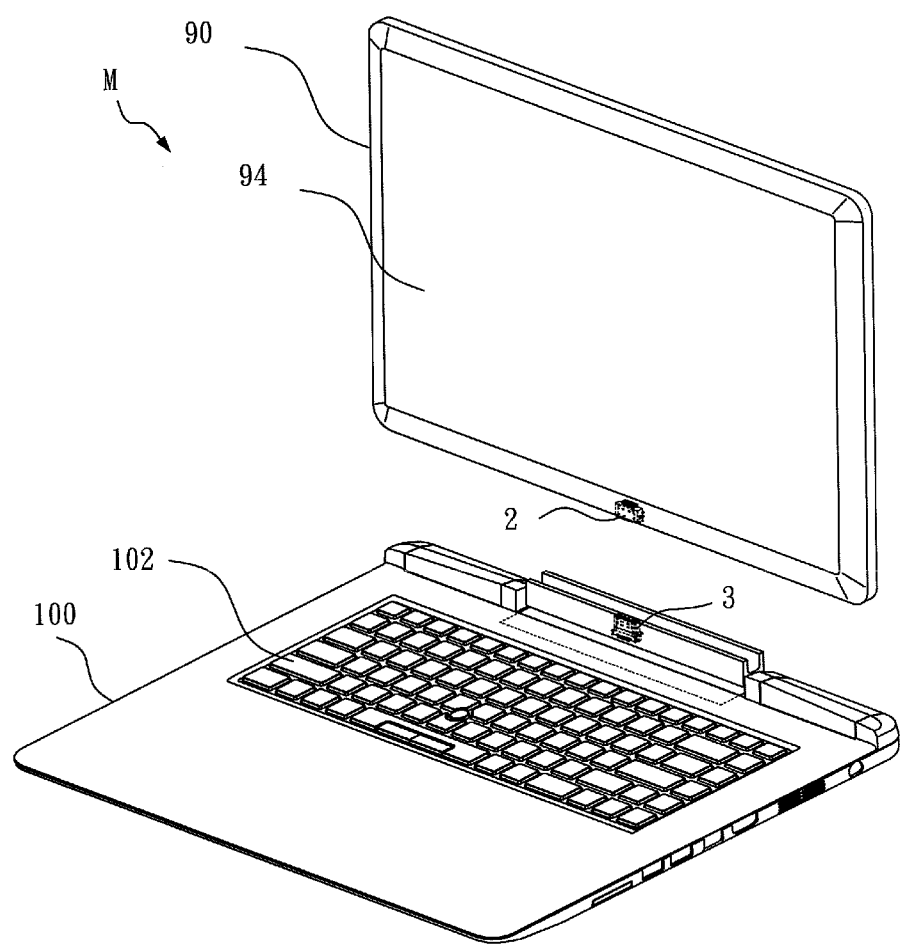
FIGS. 5A, 5B, 5C and 5D illustrate an implementation of reverse connection of a connector, in accordance with one embodiment of the present invention.

Now, please refer to FIG. 5A, FIG. 5B, FIG. 5C and FIG. 5D, which are illustrations of an implementation of reverse connection of a connector, in accordance with one embodiment of the present invention. As shown in FIG. 5A, when the connector 1 of the present invention is used to establish a reverse connection to connect the first electronic device 90 and the second electronic device 100, the casing surface 94 of the first electronic device 90 faces one end of the second electronic device 100. The first connection component 2 is positioned on the first electronic device 90, while the second connection component 3 is positioned on the second electronic device 100.

Figure 5B:
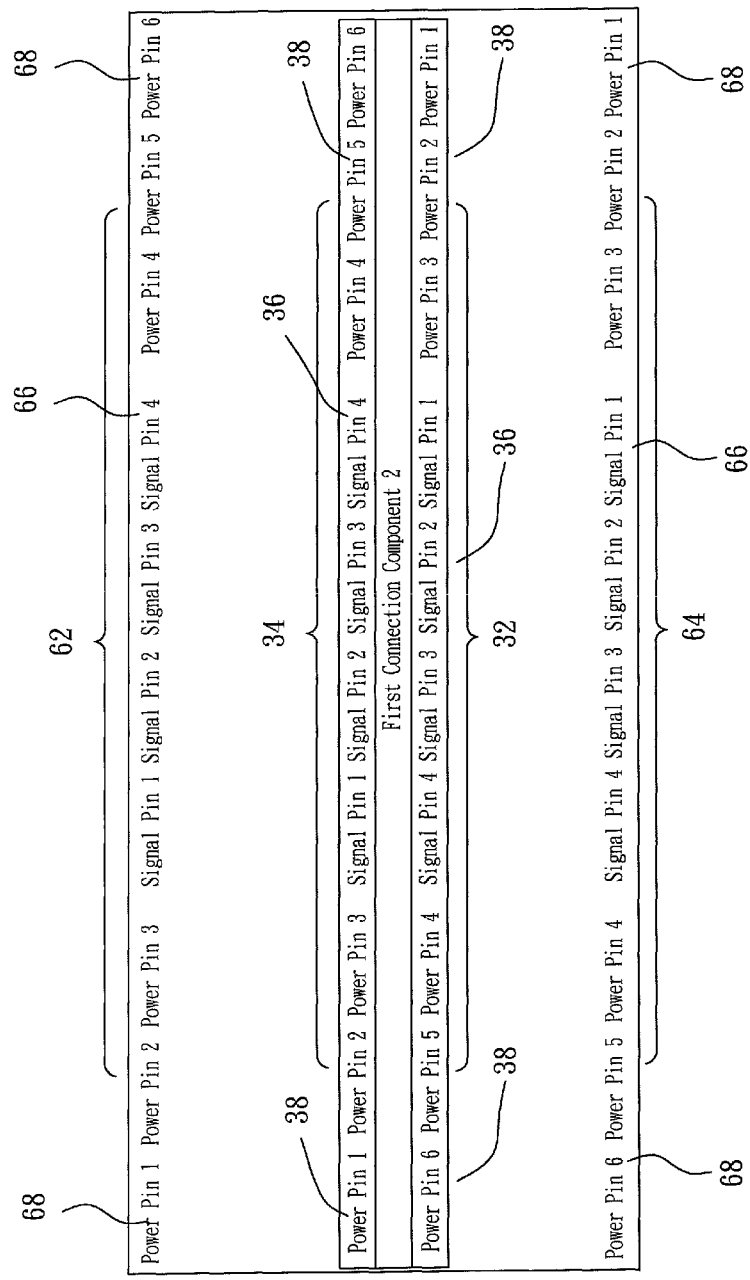

Please refer to FIG. 5B. When the first connection component 2 establishes a reverse connection with the second connection component 3, the plurality of first group contact pins 32 connect with the plurality of second group corresponding pins 64, while the plurality of second group contact pins 34 connect with the plurality of first group corresponding pins 62. Among them, the plurality of signal contact pins 36 in the plurality of first group connect pins 32 connect with the plurality of signal corresponding pins 66 in the plurality of second group corresponding pins 64, while the plurality of power contact pins 38 in the plurality of first group contact pins 32 connect with the plurality of power corresponding pins 68 in the plurality of second group corresponding pins 64; the plurality of signal contact pins 36 in the plurality of second group contact pins 34 connect with the plurality of signal corresponding pins 66 in the plurality of first group corresponding pins 62, while the plurality of power contact pins 38 in the plurality of second group contact pins 34 connect with the plurality of power corresponding pins 68 in the plurality of first group corresponding pins 62.

Figure 5C:
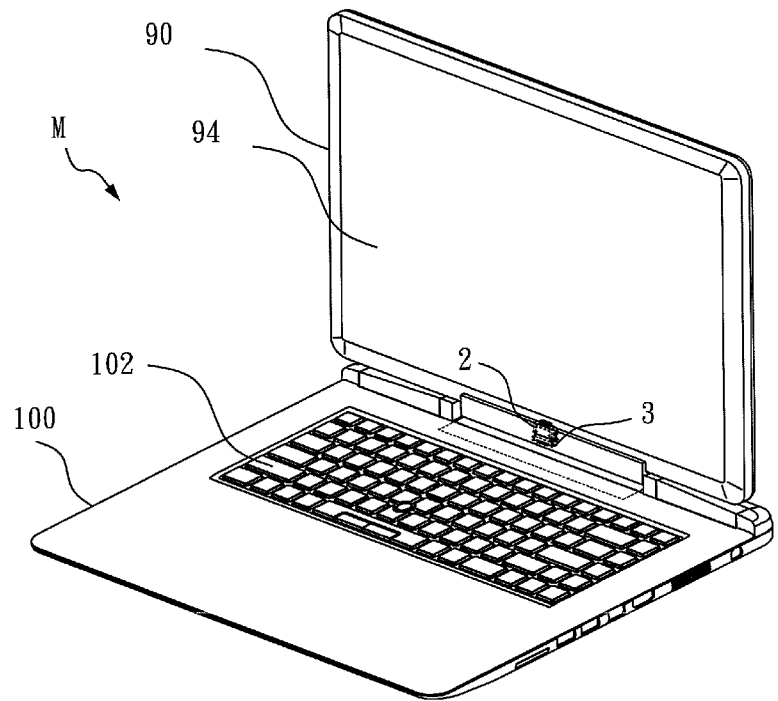
Figure 5D:
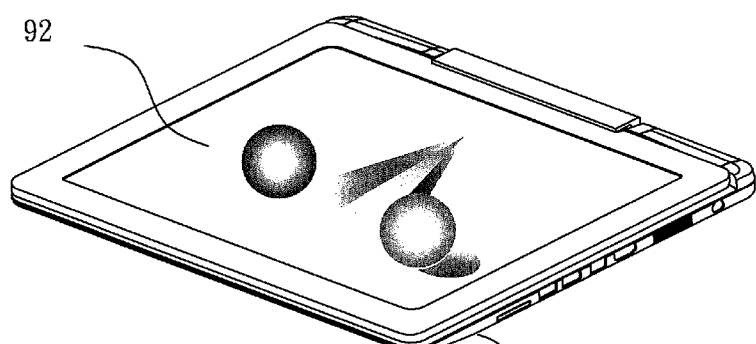

Please refer to FIG. 5C. When the first electronic device 90 and the second electronic device 100 are unfolded and in use, the casing surface 94 of the first electronic device 90 faces one end of the second electronic device 100. As shown in FIG. 5D, when the first electronic device 90 and the second electronic device 100 are folded up, the display screen 92 of the first electronic device 90 faces upward. Users can watch the display screen 92 and perform operations. At this point, the entire electronic apparatus system M is equivalent to a regular tablet computer; however, it can still draw battery power from the second electronic device 100.

It is noted that the above-mentioned embodiments are only for illustration. It is intended that the present invention cover modifications and variations of the present invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A connector, comprising:
   a first connection component, comprising:
   a first connecting casing; and
   a plurality of contact pins, which are mounted upon the first connecting casing, wherein the plurality of contact pins comprise a plurality of first group contact pins and a plurality of second group contact pins; the number of the plurality of first group contact pins and the number of the plurality of second group contact pins are equal; the sequence of pins of the plurality of first group contact pins and the sequence of pins of the plurality of second group contact pins are arranged in an opposite order; and
   a second connection component, comprising:
   a second connecting casing; and
   a plurality of corresponding pins, which are mounted upon the second connecting casing, wherein the plurality of corresponding pins comprise a plurality of first group corresponding pins and a plurality of second group corresponding pins; the number of the plurality of first group corresponding pins and the number of the plurality of second group corresponding pins are equal; the sequence of pins of the plurality of first group corresponding pins and the sequence of pins of the plurality of second group corresponding pins are arranged in an opposite order;
   with this arrangement, when there is a forward connection between the first connection component and the second connection component, the plurality of first group contact pins are connected to the plurality of first group corresponding pins, and the plurality of second group contact pins are connected to the plurality of second group corresponding pins; when there is a reverse connection between the first connection component and the second connection component, the plurality of first group contact pins are connected to the plurality of second group corresponding pins, and the plurality of second group contact pins are connected to the plurality of first group corresponding pins;
   wherein the plurality of contact pins include a plurality of signal contact pins and a plurality of power contact pins; the plurality of corresponding pins include a plurality of signal corresponding pins and a plurality of power corresponding pins;
   wherein the plurality of signal contact pins are located in the middle of the plurality of power contact pins; while the plurality of signal corresponding pins are located in the middle of the plurality of power corresponding pins.

2. An electronic apparatus system, comprising:
   a first electronic device:
   a second electronic device; and
   a connector for connecting the first electronic device and the second electronic device, the connector comprising:
   a first connection component connected with the first electronic device electrically, comprising:
   a first connecting casing; and
   a plurality of contact pins, which are mounted upon the first connecting casing, wherein the plurality of contact pins comprise a plurality of first group contact pins and a plurality of second group contact pins; the number of the plurality of first group contact pins and the number of the plurality of second group contact pins are equal; the sequence of pins of the plurality of first group contact pins and the sequence of pins of the plurality of second group contact pins are arranged in an opposite order; and a second connection component, comprising:
a second connecting casing; and
a plurality of corresponding pins, which are mounted up on the second connecting casing, wherein the plurality of corresponding pins comprise a plurality of first group corresponding pins and a plurality of second group corresponding pins; the number of the plurality of first group corresponding pins and the number of the plurality of second group corresponding pins are equal; the sequence of pins of the plurality of first group corresponding pins and the sequence of pins of the plurality of second group corresponding pins are arranged in an opposite order;

with this arrangement, when there is a forward connection between the first connection component and the second connection component, the plurality of first group contact pins are connected to the plurality of first group corresponding pins, and the plurality of second group contact pins are connected to the plurality of second group corresponding pins; when there is a reverse connection between the first connection component and the second connection component, the plurality of first group contact pins are connected to the plurality of second group corresponding pins, and the plurality of second group contact pins are connected to the plurality of first group corresponding pins;

wherein the plurality of contact pins include a plurality of signal contact pins and a plurality of power contact pins; the plurality of corresponding pins include a plurality of signal corresponding pins and a plurality of power corresponding pins;

wherein the plurality of signal contact pins are located in the middle of the plurality of power contact pins; while the plurality of signal corresponding pins are located in the middle of the plurality of power corresponding pins.

* * * * *